(12) United States Patent
Roth

(10) Patent No.: US 8,875,616 B2
(45) Date of Patent: Nov. 4, 2014

(54) FACILITY FOR INTRODUCING HOP INTO A TANK

(75) Inventor: Wolfgang Roth, Niederstotzingen (DE)

(73) Assignee: ROLEC Prozess- und Brautechnik GmbH, Chieming (DE)

( * ) Notice: Subject to any disclaimer, the term of this patent is extended or adjusted under 35 U.S.C. 154(b) by 579 days.

(21) Appl. No.: 13/065,255

(22) Filed: Mar. 17, 2011

(65) Prior Publication Data

US 2012/0237654 A1 Sep. 20, 2012

(51) Int. Cl.
| | | |
|---|---|---|
| C12C 3/00 | (2006.01) | |
| C12C 11/11 | (2006.01) | |
| C12C 13/00 | (2006.01) | |

(52) U.S. Cl.
CPC . *C12C 3/00* (2013.01); *C12C 11/11* (2013.01); *C12C 13/00* (2013.01)
USPC .................................. 99/278; 99/276; 99/277

(58) Field of Classification Search
USPC ........................................... 99/278, 276, 277
See application file for complete search history.

(56) References Cited

U.S. PATENT DOCUMENTS

| | | | | |
|---|---|---|---|---|
| 3,523,799 A | * | 8/1970 | Rigby | 426/429 |
| 4,282,259 A | * | 8/1981 | Wheldon et al. | 426/231 |

FOREIGN PATENT DOCUMENTS

DE 2228497 * 1/1974

OTHER PUBLICATIONS

English Translation of DE2228497 published Jan. 1974.*

* cited by examiner

*Primary Examiner* — Anthony Weier
(74) *Attorney, Agent, or Firm* — Collard & Roe, P.C.

(57) ABSTRACT

A facility for introducing hop into a tank has a hop receiving tank that can be hermetically sealed and has an outflow and an inert gas supply at its bottom. The facility furthermore has a mixing apparatus that has two inlet pipes on its inflow side and an outlet pipe on the outflow side. This facility is adapted to a method for introducing hop into a tank, in which hop is put into a hop receiving container, air is expelled from the hop receiving container by inert gas and the hop with beer or "young beer" is supplied to the mixing apparatus.

9 Claims, 1 Drawing Sheet

FACILITY FOR INTRODUCING HOP INTO A TANK

BACKGROUND OF THE INVENTION

1. Field of the Invention

The invention relates to a facility and a method for introducing hop into a tank.

2. Description of the Related Art

Hop is usually added to the wort in the copper or at the latest in the whirlpool. However, adding hop to the "young beer" after adding the yeast is also known. To this end, a big bag is filled with hop and hanged into the vessel for some time. This method is in use in the Anglophone area under the term "dry hopping". In order to avoid introducing detrimental micro-organisms with the bag or the hop, it has been proposed to boil the bag with the hop and to add it to the sweet wort or to the "young beer".

More specifically when using closed fermentation and storage containers it is hardly possible to still add hop in this manner, since introducing the hop bag and blending the "young beer" and hop flavours in the closed container is made more difficult.

SUMMARY OF THE INVENTION

The object underlying the invention is therefore to further develop a facility and a method for introducing hop into a tank in such a manner that a simple hop addition can also occur with closed fermentation and storage containers.

This object is solved by a facility for introducing hop into a tank which has a hop receiving tank which can be hermetically sealed and has an outflow and an inert gas supply at the bottom, and a mixing apparatus that has two inlet pipes on the inflow side and an outlet pipe on the outflow side.

This makes it possible to put hop in the form of hop pellets, hop extract, hop cones or pressed hop into a hop receiving container. The air in the container filled with hop can be driven out by means of the inert gas and replaced by inert gas such as $CO_2$ or $N_2$. Via the outflow disposed at the bottom, the hop reaches an area in which it is mixed with beer or "young beer" and flows directly to a mixing apparatus.

The components hop and "young beer" to be mixed are brought in contact with each other and intensely blended in the mixing apparatus. To this end, the mix components are fed in a dosed manner to the apparatus at the inflow connection, thoroughly mixed, dispersed or homogenized in the apparatus and carried out of the apparatus via an outflow connection. The shearing effect of the mixing apparatus leads to a grinding of the hop and to a homogenous mixing with the "young beer". An optimal dissolution of the pellets for instance is thus achieved.

A simple, compact layout is achieved if the mixing apparatus has a motor and the hop receiving container is disposed above the mixing apparatus and the motor below the mixing apparatus. The hop can thus get from the hop receiving container to an area in which it is mixed with "young beer", after which it is thoroughly grinded in the mixing apparatus in order to be blended with the "young beer". A motor with a vertical shaft can thus drive the mixing apparatus without deviation.

In order to feed the pellets to the mixing apparatus without a conveyor, it is proposed that the hop receiving container has a conical bottom.

In order to allow the inert gas to flow bottom-up through the hop, it is proposed that the hop receiving container has a gas outlet in an upper area.

In order to prevent air or inert gas from being sucked into the mixing apparatus it is proposed to use a mixing apparatus that does not automatically aspirate.

It is advantageous if a mixing apparatus is used that has a particular delivery height of more than 10 m. The mixing apparatus can thus also be used as a pump in order to convey the mixture of hop and "young beer" into a storage tank. Since as a rule the storage tank is under pressure, a delivery height of more than 10 m in the mixing apparatus is expedient.

A simple layout of the facility is achieved with a mixing apparatus that has a stator and a mixing tool as a rotor. The mixing tool is thereby preferably equipped with teeth and slots.

A preferred implementation variant provides that the mixing apparatus is adjustable for different grinding profiles.

Regarding the method, the object is solved by a method for introducing hop into a tank in which hop is put into a hop receiving tank, air is driven out of the hop receiving tank by inert gas and the hop with beer or "young beer" is supplied to a mixing apparatus.

Thereby, it must preferably be taken into account that the supply is carried out in such a manner that no beer or "young beer" gets into the hop receiving container. This can be achieved by an adapted selection of the pressures of the supplied media, whereby more specifically the volume flow of the supply of "young beer" should be controlled.

The beer or "young beer" can be conveyed to filtration after the addition of hop and the blending. It is advantageous if the beer or "young beer" is conveyed together with the hop to a tank, since the hop can then settle in the tank and can be discharged together with the yeast.

BRIEF DESCRIPTION OF THE DRAWINGS

An exemplary embodiment of the invention is shown in the drawing and is further described in the following by means of the figures. In the drawing.

DETAILED DESCRIPTION OF PREFERRED EMBODIMENTS

Figure 1:
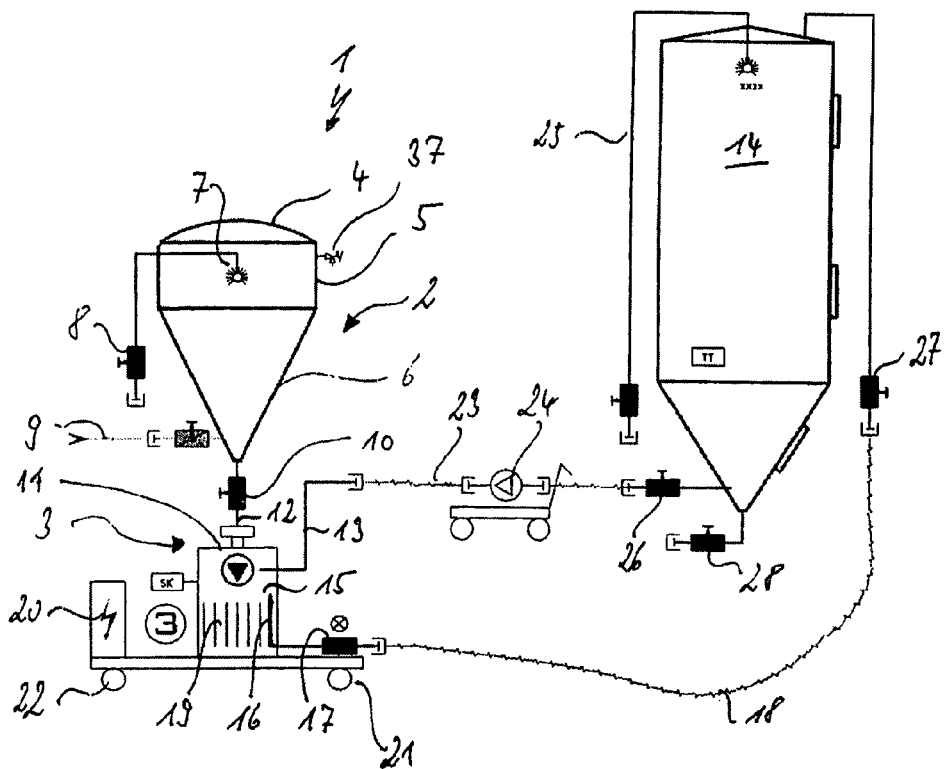
FIG. 1 show a schematic representation of a facility with a storage tank.
Figure 2:
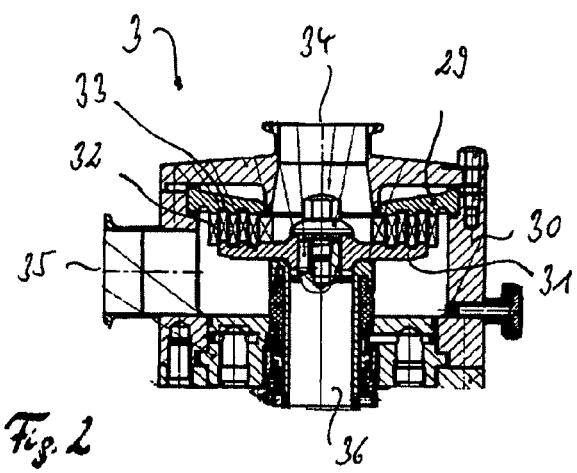
FIG. 2 shows a section through the mixing apparatus.

The facility 1 shown in FIG. 1 essentially consists of the hop receiving container 2 and the mixing apparatus 3. The hop receiving container 2 has a cover 4, a frame 5 and a conical outflow 6. The cover 4 can be hermetically sealed and a cleaning device 7 that, as a CIP spray head, is supplied with cleaning fluid via the valve 8, is provided in the upper area of the frame 5.

An inert gas supply 9 is located in the conical bottom 6 and an outflow valve 10 is located in the cone point of the conical bottom 6.

The mixing apparatus 3, which has an inlet pipe 12 for the hop on the inflow side 11 disposed at the top and an inlet pipe 13 for "young beer" from the storage tank 14, is located under this outflow valve and thus under the conical bottom 6. An outlet pipe 16 for the hop—"young beer" mixture is provided on the outflow side 15. The outlet pipe 16 is connected to the tank 14 via a valve 17 and a hose 18.

A motor 19, which drives the mixing apparatus and is configured as a three-phase motor, is provided under the mixing apparatus 3. The normal operating point of the three-phase motor and of the mixing apparatus lies at approximately 3000 $min^{-1}$. This corresponds to 50/60 Hz. A switch box 20 is provided for the energy supply.

The switch box 20, the motor 19, the mixing apparatus 3 and the hop receiving container 2 are disposed on a wagon 21 that has wheels 22 and can thus be driven to different tanks in the storage cellar.

The supply of "young beer" to the mixing apparatus occurs via a "young beer" pump that is inserted between the storage tank 14 and the mixing apparatus 3. Under ideal pressure conditions, the supply of "young beer" can occur directly from the storage tank 14 via a hose. The storage tank 14 also has a cleaning device 25. The "young beer" is extracted via a valve 26 or 28, the "young beer"—hop mixture is supplied via the valve 27 or 26, respectively 28 and the stored beer is extracted from the tank 14 via the valve 26 or 28.

The mixer 3 has a stator 29 that is inserted as an insert panel into a casing 30. A rotor 31 with the mixing tool 32 moves relative to this stator. This mixing tool 32 has teeth and slots that interact with corresponding recesses 33 in the stator 29.

Depending on which mixing tool 32 is used, the mixing apparatus 3 is adjustable to defined grinding profiles by exchanging the stator.

In the exemplary embodiment of the mixing apparatus 3, the inflow 34 lies at the top, the outflow 35 laterally and the shaft 36 which drives the rotor 31 with the mixing tool 32 comes from the motor 19 located under it.

When using the hop receiving container 2, the cover is first opened in order to put hop, preferably as pellets, into the hop receiving container 2. The cover 4 is subsequently hermetically sealed and the hop receiving container 2 is filled with $CO_2$ via the inert gas supply 9 starting from the cone. The heavier $CO_2$ displaces the air contained in the hop receiving container 2 which leaves the hop receiving container 2 via the gas outlet 37.

The outflow valve 10 is subsequently opened, so that the hop flows out of the hop receiving container 2 to the mixing apparatus 3. The hop is grinded there by means of the mixing tool 32 and mixed with the "young beer". It then leaves the mixing apparatus 3 via the outlet 35 in order to be fed again into the tank 14.

What is claimed is:

1. A facility (1) for introducing hop into a tank
    with a hop receiving container (2) that can be hermetically sealed by a cover (4) and has an outflow and an inert gas supply (9) at its bottom and presence of a gas outlet (37) near the cover (4), and
    with a mixing apparatus (3) that has two inlet pipes (12, 13) on the inflow side (11) and an outlet pipe (16) on the outflow side.

2. The facility according to claim 1, wherein the mixing apparatus (3) has a motor (19) and wherein the hop receiving container (2) is disposed above the mixing apparatus (3) and the motor (19) is disposed under the mixing apparatus (3).

3. The facility according to claim 1, wherein the hop receiving container (2) has a conical bottom (6).

4. The facility according to claim 1, wherein the hop receiving container (2) has said gas outlet (37) in an upper area.

5. The facility according to claim 1, wherein the mixing apparatus (3) does not aspirate automatically.

6. The facility according to claim 1, wherein the mixing apparatus (3) has a stator (29) and a mixing tool (32) as rotor (31).

7. A facility (1) for introducing hop into a tank
    with a hop receiving container (2) that can be hermetically sealed and has an outflow and an inert gas supply (9) at its bottom and
    with a mixing apparatus (3) that has two inlet pipes (12, 13) on the inflow side (11) and an outlet pipe (16) on the outflow side; and
    wherein the mixing apparatus (3) is adapted for grinding and has a mixing tool (32) with teeth and slots.

8. A facility (1) for introducing hop into a tank
    with a hop receiving container (2) that can be hermetically sealed and has an outflow and an inert gas supply (9) at its bottom and
    with a mixing apparatus (3) that has two inlet pipes (12, 13) on the inflow side (11) and an outlet pipe (16) on the outflow side; and
    wherein the mixing apparatus (3) is adapted for grinding and is adjustable for different grinding profiles.

9. A facility (1) for introducing hop into a tank
    with a hop receiving container (2) that can be hermetically sealed and has an outflow and an inert gas supply (9) at its bottom and
    with a mixing apparatus (3) that has two inlet pipes (12,13) on the inflow side (11) and an outlet pipe (16) on the outflow side;
    wherein the mixing apparatus (3) has a stator (29) and a mixing tool (32) as rotor (31);
    wherein the mixing apparatus (3) has a mixing tool (32) with teeth and slots; and
    wherein the mixing apparatus (3) is adapted for grinding and is adjustable for different grinding profiles.

* * * * *